Aug. 26, 1941.　　　　P. L. FAUTH　　　　2,253,696
METHOD FOR EXTRACTION OF OIL SEEDS
Filed June 30, 1937　　　2 Sheets-Sheet 1

INVENTOR
PHILIPP LORENZ FAUTH
BY
Richards to Geier
ATTORNEYS

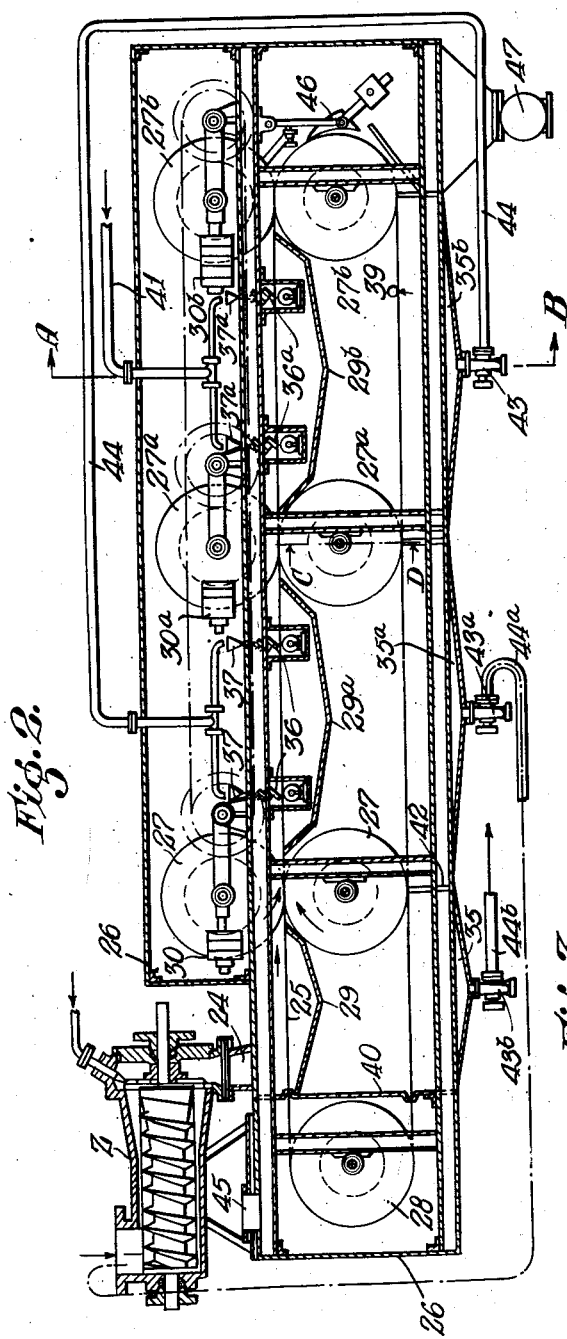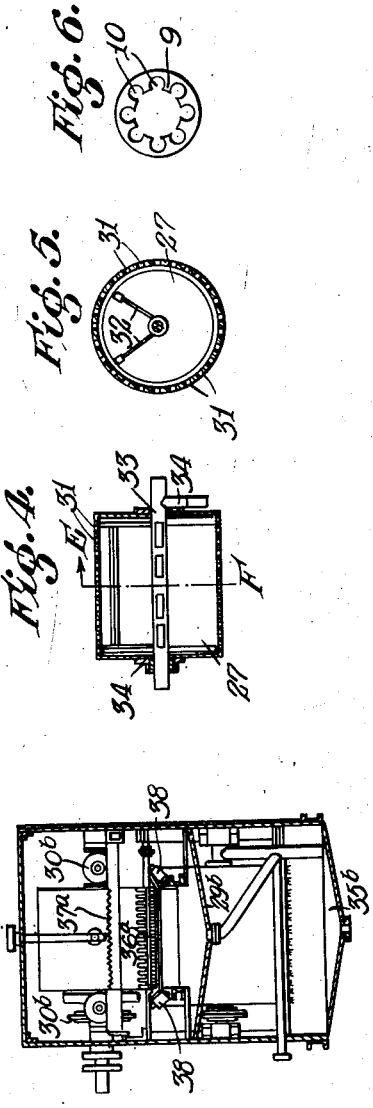

Patented Aug. 26, 1941

2,253,696

UNITED STATES PATENT OFFICE 2,253,696

METHOD FOR EXTRACTION OF OIL SEEDS

Philipp Lorenz Fauth, Wiesbaden-Dotzheim, Germany; Wilhelm Fauth, administrator of the estate of said Philipp L. Fauth, deceased Application June 30, 1937, Serial No. 151,138
In Germany July 2, 1936

6 Claims. (Cl. 260—412.2)

The invention relates to the method of and apparatus for comminuting and if desired extracting materials, in particular oil seeds.

It is known that in the extraction of oil seeds the comminution or disintegration plays an essential part. Hitherto the comminution for example of copra, palm kernels, soya beans and earth nuts was carried out by preliminarily breaking these materials in rolling mills into small pieces, then heating them in warming pans and finally crushing them finely in crushing rollers, whereupon they are treated in the extraction plant for the purpose of lixiviating the oil.

As the oil seeds consequent on their different type of structure must be preliminarily broken up in different ways, hitherto an oil factory treating different seeds required an extensive and expensive comminuting plant.

It is known that rollers, such as hitherto employed almost exclusively as comminuting devices for oil manufactories have a small output in relation to the power consumed. Thus for example in order to comminute a ton of palm kernels per hour a set of four rolls for preliminarily breaking and two sets of crushing rolls for crushing are necessary. Moreover many superposed warming pans are required in order to prepare for crushing on the sets of crushing rollers.

The problem had therefore to be solved of providing a comminuting device by means of which in a single operation any suitable oil seed can be comminuted in the desired manner and in which by simple handling the degree of disintegration can be regulated.

Such a device is hereinafter described. This device permits not only disintegration in a single working operation but also allows the commencement of lixiviation by solvents to be combined with the disintegrating operations, so that not only can the extraction be shortened and manufacturing costs lowered but also the cost of the extraction plant considerably reduced and a more rapid and intensive lixiviation can be carried out. This disintegrating device is thus a constituent of the extraction plant proper.

It is further known that in the extraction methods hitherto employed filtration off of the solution of extracted oil from the residues causes difficulties as in all cases in which sieves are employed for separating the solution from the residues considerable quantities of fine extraction material pass through the sieves with the solution.

Moreover in pressing out the lixiviated extraction material for example by worm presses or in using perforated rolls considerable quantities of extraction material pass into the solution pressed out which can then only be difficultly filtered.

Also the filter cakes remaining on filtration of the solution have still a high oil content and must therefore be again subjected to the extraction process. The expenses for carrying out the filtration method thus form a considerable part of the total costs of the apparatus and extraction.

It is known that only filtration through a filter cloth or through floated filter material replacing the filter cloth gives a clear solution. Experiments have shown that a fine fabric, for example a cloth fabric having 2000 meshes per sq. cm., provides a considerably clearer filtrate than a twilled-bronze fabric with 10,000 meshes per sq. cm. which is explained by the fact that the wire filaments used for the production of the bronze fabric have smooth surfaces while those of the cloth threads present a large amount of fibre which retains the fine clouding material so that better filtration is obtained by a cloth in spite of the much greater width of mesh.

It has now further been found that based on this knowledge the extraction and filtration operation can be considerably improved if the extraction of the oil seeds, which has already been initiated by introducing solvent into the disintegrating device during comminution, is continued on a rotating filter band, for which purpose the extraction material mixed with solvent coming from the disintegrating device is spread in a thin layer on the rotating filter cloth and is pressed on its further passage through the extraction plant in known manner and the press cakes again loosened and further treated with solvent. Thus also the solution produced in this manner can be used for the further enrichment in accordance with the counter-current principle again for lixiviating the press cakes in such manner that the fresh solvent is used for lixiviating the already repeatedly expressed and most extensively lixiviated press cake and the solution thus obtained then supplied to the previously pressed and less lixiviated press cake and the solution thus produced used for lixiviation of the previously pressed and lixiviated material or delivered into the disintegrating device.

The comminution and lixiviation of the material can also be carried out in stages in such manner that a disintegrating device is interposed between each pair of pressing devices.

The new comminuting and extracting apparatus is illustrated in the accompanying drawings in which Fig. 1 is a longitudinal section through the disintegrating device, Fig. 2 a longitudinal section through the complete extraction plant with a built-in disintegrating device as shown in Fig. 1.

Fig. 3 is a section on the line A—B of Fig. 2.

Fig. 4 a section through the lower crushing roller of the extraction plant on the line C—D of Fig. 2.

Fig. 5 is a cross section through the crushing roller on the line E—F of Fig. 4.

Fig. 6 is a front view of the cutter counter disc.

Figure 1:
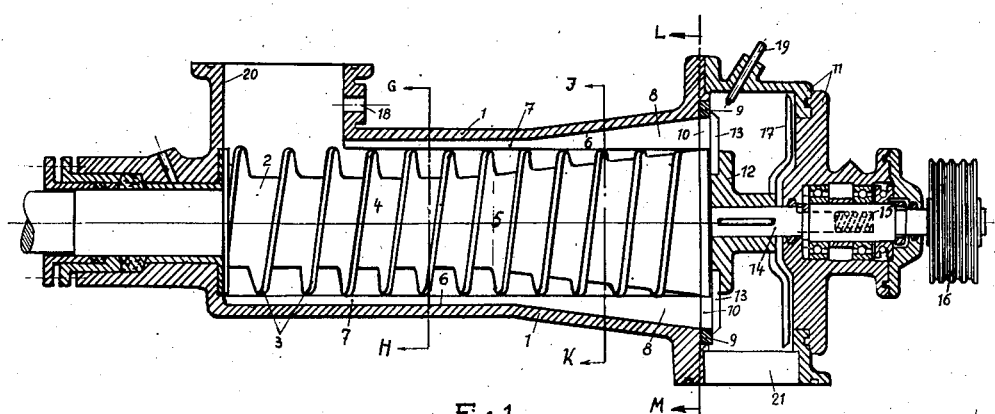
Figure 10:
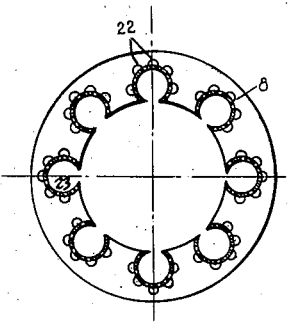
Fig. 10 shows a detail.
Figure 9:
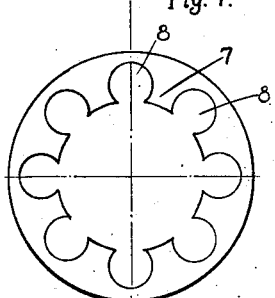
Figs. 7 to 9 are sections through the casing of the disintegrating device on the lines G—H, I—K and L—M respectively of Fig. 1.
Figure 8:
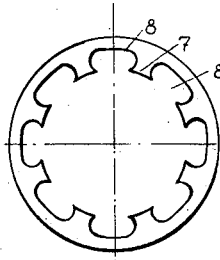
Figure 7:
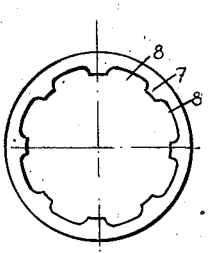

Referring to the drawings, the new disintegrating device consists essentially of a casing 1 in which is mounted a conveying and pressure worm 2 which can be set in rotation in suitable manner. As is clear from the drawings the screw threads 3 of the worm over the whole length of the pressure worm are of the same diameter but the diameter of the core 4 gradually increases from the point 5 towards the outlet end of the device in such manner that at the end it has the same external diameter as the worm threads and these threads thus run into the core of the worm. From the point at which the core becomes larger the casing also increases in size so that the distance between the core of the pressure worm and the inner wall 6 of the casing remains equally large throughout the whole length of the pressure worm. On the inner wall of the casing are provided a suitable number of longitudinal ribs 7 (for example eight) so that between these eight smooth longitudinal grooves 8 are formed open towards the pressure worm (Fig. 7). These grooves are enlarged from the said enlargement of the casing 1 (Fig. 8), and towards the outlet end of the disintegrating device gradually are transformed into circular openings (Fig. 9). Over these openings fits a closing disc 9 which is provided with the same number of bores 10 and engages over the rear end of the core of the pressure worm and forms a bearing therefor. On this closing disc is moved in a casing 11 a cutting disc 12 on which the cutter blades 13, for example six, are located. The cutter 13 which is secured to the shaft 14 and is pressed by an adjustable pressure spring 15 against the closing disc 9 acting as an opposing cutter is set in rotation by the belt pulley 16. In order to prevent the disintegrated material from being thrown against the stuffing box on the shaft 14 there is provided on the cutter disc a baffle disc 17. Solvent can be supplied to the disintegrating device through the nozzles 18 and 19.

The mode of operation with this disintegrating device is as follows: The material to be comminuted is passed through the inlet hopper 20 into the disintegrating device, in which it is moved forward by the conveyor and pressure worm 2 and pressed into the bores 8 in such manner that the material originally consisting of separate parts now forms a pressed coherent mass. In the present case as eight bores 8 are provided eight coherent ropes are obtained. If oil seeds, such as soya beans, earth nuts, rape and the like, are being treated solvent can be introduced through the nozzle 18 into the disintegrating device so that on the passage of material through the disintegrating device lixiviation of the material is already initiated.

The said ropes under the pressure of the conveyor worm 2 pass out through the corresponding bores 10 of the closing disc 9 and are cut off by the cutters 13 of the cutting disc 12. The degree of comminution can be varied by altering the speed of rotation of the cutter disc, so that with the new device with any suitable material any desired degree of comminution can be obtained. The disintegrated material passing out of the bores 10 is sprayed by the nozzle 19 with solvent so that the oil passing out of the material on comminution is immediately taken up by the solvent. The mixture thus obtained of solvent and comminuted material then passes through the outlet opening 21 into the extraction plant proper (Fig. 2) in which it is treated for the further lixiviation of the oil with solvent and subjected to pressing operations.

According to a modification the said bores 8 can be provided in the rear part also with small longitudinal channels 22 and sieves 23 can be arranged in front thereof so that on the pressing of the material treated by the conveyor worm 2 the oil escaping or the added solvent together with the oil taken up can flow off through these longitudinal channels to the outlet opening 21 and thus a greater compression of the handled material is obtained.

In Figure 2, Z indicates the above described disintegrating device. The comminuted material saturated with solvent and coming from the disintegrating device passes through the branch 24 to the filter band 25 which travels in a gas tight closed casing 26 between a plurality of roll presses 27, 27a, 27b and passes in the direction of the arrow around the drum 28 which is adapted to be heated. Beneath the filter band 25 are located receiving pans 29, 29a, 29b in which, on rotation of the filter cloth, a large part of the solution flows off from the treated material.

The material is first passed between the two rollers of the roll press 27 by the filter cloth. The upper roll of this roll press is loaded by movable pressure weights 30 in order to permit of regulating the pressure. The pressure can also be regulated by spring or hydraulic pressure. The roll itself is a hollow body which can be filled with a liquid in order to increase the pressure weight. The wall of the lower roll of the roll press 27 (Figs. 4 and 5) which is provided with flow off slots 31 extending conically inwards, runs over a fixed receiving pan 32. The outlet pipe of this receiving pan 32 passes through the hollow shaft 33 of the roll 27 and is guided through the stuffing box 34. As soon as the extraction material passes on to the band between the roll presses the solution pressed out by the pressing operation flows through the filter cloth 25 and the slits 31 of the lower roll into the receiving pan 32 and flows off into the collecting pan 35. After the passage through the roll press 27 the material is led to a second roll press 27a, after it has been repeatedly loosened on its path by rotating rakes 36 and in this operation is sprayed with fresh solvent or with enriching solution. These lixiviating liquids are supplied to distributing channels 37 arranged above the rakes which extend over the whole useful width of the filter cloth. At the point at which the rakes 36 operate the filter band 25 is guided by inclined guide rolls 38 (Fig. 3). By the repeated loosening between two roll presses and the repeated spraying with solvent the process of lixiviation of the extraction material uniformly distributed over the band is effectively carried out. The above described operation is repeated in the roll presses 27a and 27b and on the passage to the roll presses.

The filter band as soon as it leaves the lower roll 27b on its return flight is flushed with fresh solvent from the inner supporting surface outwards by the spraying device 39 so that any particles of dirt pressed in from above which might affect filtration are again washed out. The drum 28 which is separated by the partition wall 40 from the remainder of the extraction device is heated by steam. As soon as the cloth saturated with solvent for example gasoline passes on to the heated drum 28 the gasoline is evaporated and simultaneously therewith also the moisture taken up by the cloth.

The solvent is led in counter-current to the movement of the material. Between the rolls 27a and 27b fresh solvent is supplied through the pipe 41. The receiving chamber for the solvent is divided by partitions 42 into three chambers 35, 35a and 35b. From the receiving chamber 35b which lies beneath and between the pair of rolls 27a and 27b the solvent is introduced by the pump 43 and pipe 44 into the spraying devices 37, located between the pair of rolls 27 and 27a. From the receiving chamber 35a which lies beneath and between the rolls 27 and 27a the solution obtained is introduced into the disintegrating device Z by means of the pump 43a and pipe 44a for the purpose of further enrichment and the solution reaching the chamber 35 is led through pump 43b and pipe 44b for distillation. The vapours produced on evaporation by the heated roller 28 are led through the outlet branch 45 to a condenser not shown in the drawings.

The roll 27b is provided with a stripper 46 by which the expressed residues freed from oil are removed from the filter band. These then pass through the sluice 47 into a device not shown in the drawings in which the final residue of gasoline is removed from the treated material.

The extraction operation can be conducted also by effecting a coarse preliminary comminution of the material in a disintegrating device first with the addition of solvent and then by pressing by a roll press as above described and then again leading the material with solvent through a disintegrating device for subsequent comminution and again pressing out so that the disintegration in the solvent is effected in stages and lixiviation and pressing out is effected on the travelling band between each disintegrating stage.

The method and the apparatus described can in addition to being used for comminution and extraction of oil seeds be used also for comminution and lixiviation of other materials such as beetroot, or can be used for comminution and expressing of fruits, such as apples for example for cider pressing purposes and for similar purposes.

I claim:

1. A method of treating oil bearing materials, in particular oil seeds, comprising pressing the oil bearing material to be treated on its passage to the location where it is to be comminuted with addition of solvent into a coherent strand-like mass and comminuting it in this form with further addition of solvent, spreading the mass of solvent and comminuted material resulting from comminution in a uniform thin layer on a rotating filter band for the purpose of separating the solution and residue and further extraction of the residue, pressing the material on its further passage into cakes, repeatedly loosening the pressed cakes and further lixiviating with solvent.

2. A method as claimed in claim 1 wherein the filter band on its rotation after removal of the residue freed from oil is sprayed with solvent for cleaning purposes from the inner supporting surface outwards and thereupon is led over a heated filter drum for the purpose of removal of the solvent and the moisture arising from the extraction before again using the filter band for filtration.

3. A method of treating oil bearing materials, particularly oil seeds, comprising pressing the oil bearing material to be treated on its passage to the location where it is to be comminuted into a coherent strand-like mass, and cutting it up in this form for the purpose of extracting it.

4. The method of comminuting and extracting oil-containing materials, said method comprising, in combination, the steps of forming the material to be treated to a coherent strand-like mass by compressing the same, cutting the strands of said strand-like mass to comminute the oil-containing material, and extracting oil by lixiviating the cut strands with a solvent and pressing them.

5. The method of comminuting and extracting oil-containing materials, said method comprising, in combination, the steps of forming the material to be treated to a coherent strand-like mass by compressing the same while adding a solvent thereto, cutting the strands of said strand-like mass to comminute the oil-containing material while adding more solvent thereto, and extracting oil by lixiviating the cut strands with the solvent and pressing them.

6. The method of comminuting and extracting oil-containing materials, said method comprising, in combination, the steps of forming the material to be treated to a coherent strand-like mass by compressing the same while adding a solvent thereto, cutting the strands of said strand-like mass to comminute the oil-containing material, while adding more solvent thereto, spreading the comminuted solvent-containing mass to form a uniform thin layer, separating solution from residue of the mass, pressing the mass into cakes, repeatedly loosening the pressed cakes and further lixiviating with solvent, the comminution and lixiviation of the material being effected in stages, and disintegration being carried out between two pressing operations.

PHILIPP L. FAUTH.